Feb. 10, 1959 — D. C. GILLESPIE — 2,873,082
CLIP
Filed March 11, 1955
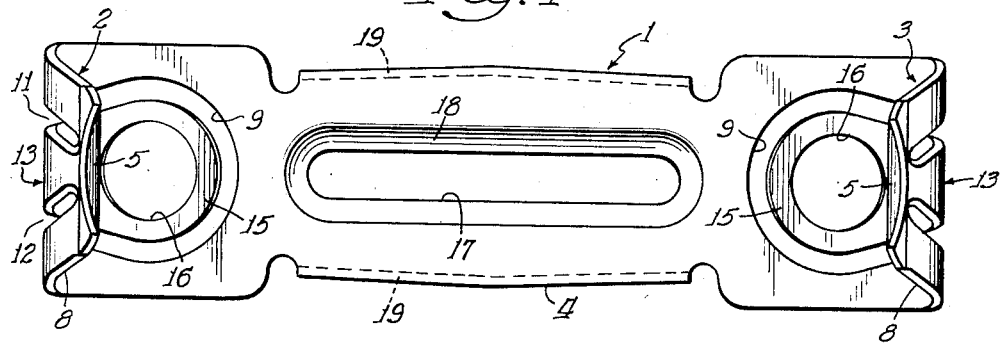
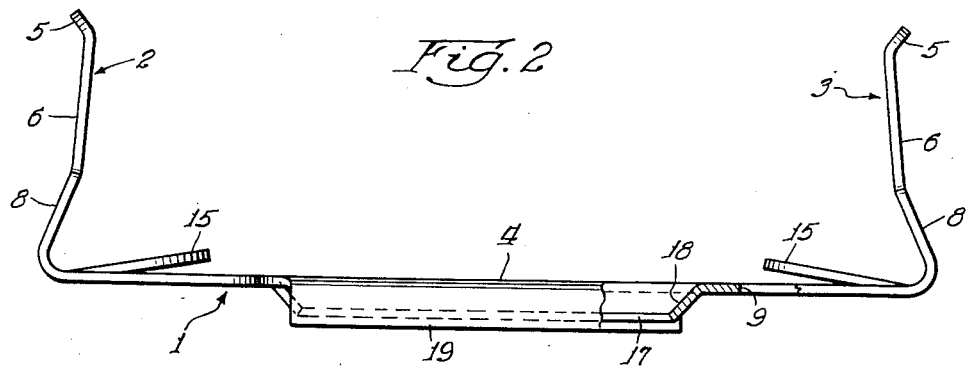
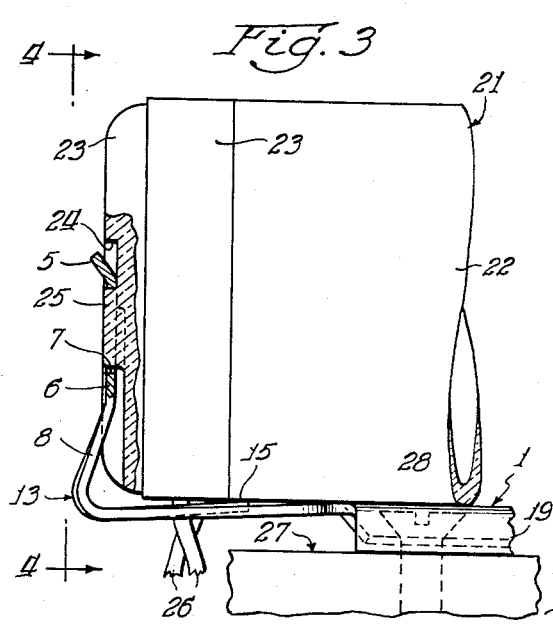
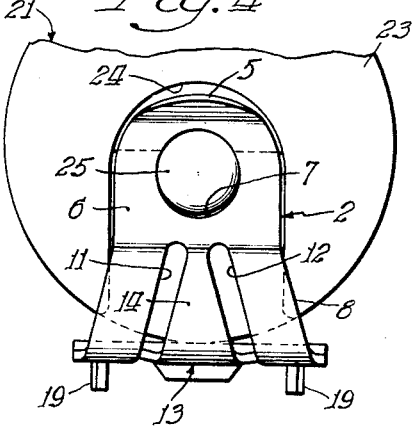
Inventor:
Daniel C. Gillespie
By: Donald W. Banner Atty.

United States Patent Office 2,873,082
Patented Feb. 10, 1959

2,873,082
CLIP

Daniel C. Gillespie, Oak Park, Ill., assignor to Borg-Warner Corporation, Chicago, Ill., a corporation of Illinois Application March 11, 1955, Serial No. 493,673

12 Claims. (Cl. 248—300)

This invention relates to means of an improved nature for holding a capacitor containing enclosure in position on an electrical motor, and more particularly, to such a device incorporating improved means for the eliminating of objectionable noise usually associated with such structure.

It is common practice to employ a capacitor in association with certain types of electrical motors, the capacitor being placed in circuit with the motor windings to effect the requisite shift of phase when the motor is started. Such capacitors are usually mounted upon the motor itself, a bracket being employed which is mounted to the motor to hold the capacitor containing enclosure in position. Many types of prior structures have been known to hold the capacitor containing enclosure in position. Many types of prior structures have been known to hold the capacitor containing enclosure in position, but all such prior structures, to the best of my knowledge, were deficient in that they fail to hold it rigidly, and further fail to prevent objectionable rattling noises during motor operation.

It is, therefore, one object of the present invention to provide new and improved structures for holding capacitor containing enclosures in position on an electrical motor.

One object of the present invention is the provision of a generally U-shaped mounting member adapted to be associated with an electrical motor, which is further characterized by the provision of spaced end members for engaging the opposite ends of the capacitor enclosure together with means engaging the capacitor enclosure and preventing movement thereof during operation of the electrical motor.

Another object is the provision of an improved structure in accordance with the preceding object in which means are provided integral with the end engaging arms of the mounting member, and which are adapted to engage the underside of the capacitor enclosure to prevent any movement thereof.

Another object is the provision of an improved structure in accordance with the preceding objects in which a clip is formed of a resilient material and includes relatively resilient tabs integral with the side arms to preveent any rattling of the capacitor enclosure.

Another object of the present invention is the provision of an improved structure in accordance with the preceding objects in which a circular aperture is formed each of the side arms of the brackets cooperating with protuberances on the ends of the capacitor enclosure, and which is further characterized by a resilient tab extending from and integral with each of the side arms for engaging the underside of the capacitor can.

Another object of the present invention is the provision of a structure in accordance with the preceding objects in which the resilient tab is provided with a central opening therein through which the electrical leads connected to the capacitor may be conveniently inserted.

Other objects and features of the invention will be readily apparent to those skilled in the art from the specification and appended drawings illustrating certain preferred embodiments in which:

Figure 1 is a plan view of the device of the present invention;

Figure 2 is a side elevational view of the device of the present invention, in which certain parts are broken away to facilitate the showing;

Figure 3 is a partial view of the device of the present invention associated with a capacitor enclosure and an electrical motor;

Figure 4 is a sectional view along the plane of line 4—4 of Figure 3.

The device of the present invention comprises a generally U-shaped bracket 1 having at either end thereof upstanding arms 2 and 3. The arms 2 and 3 are integral with a longitudinally extending body portion indicated in general by the numeral 4, the bracket 1 being formed of a resilient material such as spring steel.

Each of the arms 2 and 3 are identical, except for the opposite disposition thereof. The arms comprise an upper portion 5 bent outwardly as clearly shown in the drawings, and comprise a generally straight central portion 6 adjacent to the portion 5, the portion 6 being provided with a generally circular aperture 7. Adjacent to, and bent outwardly away from, portions 6 of the arms 2 and 3 in a portion 8 which, as best seen in Figure 4, is tapered so that the upper portion thereof has the same transverse dimension as the portion 6 while the bottom portion has the same transverse dimension as the body 4.

The opposite ends of the body 4 are formed with identical openings 9 which continue upwardly through portions 8 of the arms 2 and 3 in the form of converging slots 11 and 12 as best illustrated in Figure 4. The means defining the interior sides of the slots 11 and 12 are the outwardly facing edges of spring fingers 13, which are generally L-shaped. As seen in Figure 4, fingers 13 have vertical portions 14 which are tapered from a relatively small upper portion which is attached to the associated portions 6, the lower part of portion 14 being connected to a generally horizontally extending portion 15. As can clearly be seen in Figure 1, the portions 15 have generally circular inwardly facing surfaces which serve to define portions of the slots 9. Each of the portions 15 is further provided with a circular opening 16, for a purpose to be hereinafter described, the portions 15 being disposed, in their normal position and, as illustrated in Figure 2, at an angle of approximately 10 degrees to the plane of the body portion 4. As also illustrated in Figure 2, the portions 6 of the arms 2 and 3 are disposed at approximately 85 degrees, plus or minus 4 degrees, to the plane of the body portion 4.

As best illustrated in Figure 1, the central portion of the body 4 is provided with a narrow, longitudinally extending slot 17, which is counterbored at 18. Extending parallel to, and approximately the same length as, the slot 17 are flanges 19 which are formed by bending the opposite sides of the body portion 4 downwardly for a purpose to be hereinafter described.

In Figure 2, there is shown the normal position of the device of the present invention. The minimum longitudinal spacing between the arms 2 and 3 in this position is designed to be slightly less than the maximum longitudinal dimension of the capacitor containing enclosure (or "can") to be associated therewith. These "cans" are conventionally of a plastic, molded insulating material and a portion of one such can is illustrated at 21 in Figure 3. While such cans form no part of the present invention, a short description thereof is deemed to be useful in describing the device of the present invention. Cans 21 are formed into a generally cylindrical shape including a body portion 22 and a cap portion 23 adapted to complete the enclosure. Within the can, there is disposed a suitable capacitor for effecting the necessary phase shift in the starting of the associated electric motor. At its longitudinally opposite ends, can 21 is provided with a slot 24, and projecting outwardly from the surface of each of these slots is a raised, generally circular button 25 which is adapted to be received by the openings 7 of the arms. As best seen in Figure 3, can 21 is provided with a suitable opening through which the electrical leads 26, connected to the capacitor, project. This opening in the can is adapted to register with the opening 16 in one of the fingers 15 whereby the electrical leads 26 may project therethrough. It will be obvious to those skilled in the art that leads 26 are adapted to be suitably attached to the winding of the electric motor, a fragmentary portion of which is illustrated in Figure 3 designated by the numeral 27. The flanges 19, as seen in that figure, engage the upper portion of the motor 27 and space the other portions of the bracket therefrom, the bracket 1 being fixedly mounted to the motor 27 by suitable bolts 28 which project through the slot 17 and are received in suitable cooperating openings in the enclosure for motor 27.

It will, therefore, be seen that in utilizing the bracket 1 of the present invention, suitable bolts 28 are passed through the slots 17 and fixed to the electrical motor structure, as will be obvious to those skilled in the art. The arms 2 and 3 in the bracket 1 will be in the position, relative to the body portion 4, which is illustrated in Figure 2. A suitable capacitor "can" 21 is then inserted between the arms 2 and 3, the outwardly facing portions of the arms 5 facilitating the insertion of the can 21. "Can" 21 is then forced downwardly into the bracket 1 forcing the arms 2 and 3 outwardly against their bias until buttons 25 at opposite ends of the can snap into the opening 6 provided in the arms. The leads 26 are, of course, pulled through the opening 16 in the fingers 15 as the can is inserted. As previously indicated, the longitudinal dimension of the can 21 is slightly larger than the normal spacing between the arms 2 and 3 so that these arms are held outwardly when the can 21 is inserted therebetween. Inasmuch as the spring fingers 15 are integral with arms 2 and 3, as this spreading of the arms is effected, the spring fingers 15 tend to increase their angular displacement relative to the body portion 4 of the bracket 1. It should be particularly noted that the elongated slots 11 and 12 formed in the arms 2 and 3 result in substantial bias in the spring finger 15 when the arms 2 and 3 are spread outwardly.

As shown in Figure 3, however, the bottom portion of the can 21, when the can is so positioned within the bracket 1 that the buttons 25 extend through the openings 6 in the arms 2 and 3, engages both of the spring fingers 15 and moves them downwardly into the openings 9 against their bias. As best illustrated in Figure 3, the arms 15 are forced downwardly almost into a horizontal position. As a result, an upward force on the can 21 is applied at both ends thereof by the spaced spring fingers 15 which is a result not only of the initial positioning of the spring fingers 15 (as shown in Figure 2), but is also the result of the additional bias imparted to the spring fingers 15 by the spreading effect of the arms 2 and 3, of which the fingers 15 are an integral part. It will, therefore, be appreciated that the outward bias applied by the spaced spring fingers 15 to the capacitor "can" 21 is very substantial, and the buttons 25 extending from the opposite ends of the can 21 are forced tightly into engagement with the sides of openings 7 defining the upward portion thereof. Furthermore, when fingers 15 are forced downwardly by the "can," because of the fact that they are integral with the arms 2 and 3, the arms 2 and 3 are forced toward each other and engage the "can" ends with even greater force. As a result, "can" 21 does not rattle despite the vibrations emanating from the associated motor.

It will, therefore, be seen that while the device of the present invention is relatively simple and inexpensive to construct, it nevertheless accomplishes such a rigid grasp upon the capacitor "can" that the objectionable noises resulting from motor vibrations are substantially eliminated. Furthermore, the device of the present invention is such that the insertion therein, and the removal therefrom, of the capacitor "can" is very readily accomplished. It will furthermore be appreciated that these molded plastic capacitor "cans" frequently vary in their dimensions, as do the buttons 25; despite these sometimes substantial variations in these dimensions, the device of the present invention nevertheless operates to eliminate substantially the rattling noises found with prior art devices. It should be noted in this regard that even though the longitudinal dimension of the capacitor "can" 21 is the same as the spacing between the arms 2 and 3 in their normal position, as illustrated in Figure 2, the initial bias given to spring fingers 15 is such that the capacitor can—although substantially shorter than normally the case—will still be held tightly by virtue of the facts that fingers 2 and 3 are moved inwardly when fingers 15 are depressed, and fingers 15 force the "can" firmly into engagement with the upper portions of the openings 7 so that the objectionable rattling noises arising from the vibrations of the motor would be eliminated. It is, in addition, essential to notice that the device of the present invention may be inexpensively manufactured by simple stamping operation which lends itself to mass production technique. Further substantial economies are effected by virtue of the fact that the construction provided by the present invention permits use of lighter gauge material than previously possible inasmuch as the "holding" elements of this device are placed under substantial stress when the "can" is inserted therein to engage the "can" firmly.

While a certain preferred embodiment of the invention has been specifically disclosed, it is understood that the invention is not limited thereto, as many variations will be readily apparent to those skilled in the art and the invention is to be given its broadest possible interpretation within the terms of the following claims.

What is claimed is:

1. A device of the type adapted to mount capacitor containing enclosures upon an electric motor comprising a generally U-shaped bracket of resilient material having a longitudinally extending body portion terminating on both ends in outwardly projecting and intgeral arms, slot defining means on both end portions of said body and respectively extending into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket.

2. A device of the type adapted to mount capacitor containing enclosure upon an electric motor comprising a generally U-shaped bracket of resilient material having a longitudinally extending body portion terminating on both ends in outwardly projecting and integral arms, slot defining means on both end portions of said body and respectively extending outwardly a substantial distance into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket.

3. A device of the type adapted to mount capacitor containing enclosure upon an electric motor comprising a generally U-shaped bracket of resilient material having a longitudinally extending body portion terminating on both ends in outwardly projecting and integral arms, slot defining means on both end portions of said body and respectively extending outwardly a substantial distance into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket, and means defining an opening in said free end portion adapted to receive the electrical leads connected to said capacitor.

4. A device of the type adapted to mount capacitor containing enclosure upon an electric motor comprising a generally U-shaped bracket of resilient material having a longitudinally extending body portion terminating on both ends in outwardly projecting and integral arms, slot defining means on both end portions of said body and respectively extending outwardly a substantial distance into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket, and means defining openings in each of said arms adapted to receive projections extending from said capacitor containing enclosure, said fingers forcing said capacitor containing enclosure into tight engagement with said last-mentioned means whereby objectionable rattling noises are eliminated.

5. A device of the type adapted to mount capacitor containing enclosure upon an electric motor comprising a generally U-shaped bracket of resilient material having a longitudinally extending body portion terminating on both ends in outwardly projecting and integral arms, slot defining means on both end portions of said body and respectively extending outwardly a substantial distance into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket, means defining openings in each of said arms adapted to receive projections extending from said capacitor containing enclosure, said fingers forcing said capacitor containing enclosure into tight engagement with said last-mentioned means whereby objectionable rattling noises are eliminated, and means defining openings in said fingers adapted to receive electrical leads connected to the capacitor.

6. A device of the type adapted to mount capacitor containing enclosure upon an electric motor comprising a generally U-shaped bracket of resilient material having a longitudinally extending body portion terminating on both ends in outwardly projecting and integral arms, slot defining means on both end portions of said body and respectively extending outwardly a substantial distance into the adjacent arm, each of said slot defining means comprising a resilient finger attached at one end to the adjacent arm and including a free end portion normally projecting toward the opposite arm at a small acute angle to said body portion in a manner to engage the underside of the capacitor containing enclosure when it is disposed in said bracket, means defining openings in each of said arms adapted to receive projections extending from said capacitor containing enclosure, said fingers forcing said capacitor containing enclosure into tight engagement with said last-mentioned means whereby objectionable rattling noises are eliminated, means defining openings in said fingers adapted to receive electrical leads connected to the capacitor, and means defining a longitudinally extending slot in said body portion adapted to receive fastening means for holding the bracket to an electrical motor.

7. A device of the type adapted to mount capacitor containing enclosure upon an electric motor comprising a bracket of resilient material having a longitudinally extending body portion, a pair of arms respectively integral with the opposite ends of said body portion and projecting outwardly therefrom; each of said arms comprising an inner portion attached to said body portion on one end and projecting inwardly toward the center of said body portion, and outwardly extending central portion attached to one end of said inner portion and normally expanding outwardly at slightly less than ninety degrees with respect to said body portion, and an outer portion connected at one end of said central portion and projecting outwardly in a direction away from the opposite arm; means defining a continuous slot in the inner portion of each of said arms and the adjacent body portion, each of said slot defining means comprising a resilient finger attached at one end to said central portion of said arm and including a free end portion normally projecting toward the opposite arm at a small acute angle to said body portion in a manner to engage the underside of the capacitor containing enclosure when it is disposed in said bracket.

8. The device defined in claim 7 in which said slot defining means are constructed and arranged to provide a pair of slots in each of said arm inner portions which tend to converge as they increase in distance from said body portion.

9. The device defined in claim 7 in which said slot defining means are constructed and arranged to provide a pair of slots in each of said arm inner portions which tend to converge as they increase in distance from said body portion, and means defining an opening in each of said resilient fingers adapted to receive the electrical leads connected to said capacitor.

10. The device defined in claim 7 in which said slot defining means are constructed and arranged to provide a pair of slots in each of said arm inner portions which tend to converge as they increase in distance from said body portion, means defining an opening in each of said resilient fingers adapted to receive the electrical leads connected to said capacitor, and means defining apertures in each of said central arm portions adapted to receive projections extending from opposite ends of said capacitor containing enclosure, said enclosure being forced into tight engagement with said last-mentioned means by said fingers.

11. The device defined in claim 7 in which said slot defining means are constructed and arranged to provide a pair of slots in each of said arm inner portions which tend to converge as they increase in distance from said body portion, means defining an opening in each of said resilient fingers adapted to receive the electrical leads connected to said capacitor, means defining apertures in each of said central arm portions adapted to receive projections extending from opposite ends of said capacitor containing enclosure, said enclosure being forced into tight engagement with said last-mentioned means by said fingers, and means defining a longitudinally extending slot in said body portion adapted to receive fastening means for connecting said bracket to an electric motor.

12. A spring metal bracket for supporting an elongate capacitor case and closure cap assembly having outwardly extending studs at opposite ends axially aligned with each other, said bracket comprising an elongate base, arms extending upwardly from the ends of the base respectively and inclining generally toward each other, a hole in each arm to receive one of said studs when the case is forced between the arms, and a tongue integral with the lower end of each arm having its free end extending inwardly in position to be engaged by the case substantially upon the entering of the studs into said holes, thereby to rigidify the arms and cause same intimately and tightly to grip the ends of the case, said tongue being struck from said arms and having free ends spaced upwardly from the base.

References Cited in the file of this patent

UNITED STATES PATENTS

| | | |
|---|---|---|
| 2,160,009 | Walker | May 30, 1939 |
| 2,219,495 | Sleeter | Oct. 29, 1940 |
| 2,460,903 | Peck | Feb. 8, 1945 |
| 2,731,229 | Sietz | Jan. 17, 1956 |
| 2,762,597 | Jaworski | Sept. 11, 1956 |